United States Patent
Lamstein

(10) Patent No.: US 7,669,551 B2
(45) Date of Patent: Mar. 2, 2010

(54) PET ACTIVITY SYSTEM

(75) Inventor: Aaron Lamstein, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 330 days.

(21) Appl. No.: 11/698,419

(22) Filed: Jan. 26, 2007

(65) Prior Publication Data

US 2008/0178821 A1    Jul. 31, 2008

(51) Int. Cl.
*A01K 29/00* (2006.01)

(52) U.S. Cl. .................. 119/28.5; 119/702; 119/707

(58) Field of Classification Search ............ 119/28.5, 119/702, 706, 707
See application file for complete search history.

(56) References Cited

U.S. PATENT DOCUMENTS

| | | | | |
|---|---|---|---|---|
| 2,662,335 | A * | 12/1953 | Calverley | 446/99 |
| 3,029,551 | A * | 4/1962 | Reiskin | 446/227 |
| 3,392,480 | A * | 7/1968 | Stubbmann | 446/121 |
| 3,477,167 | A * | 11/1969 | Ach | 446/101 |
| 3,550,311 | A * | 12/1970 | Fouquart | 446/102 |
| 3,670,449 | A * | 6/1972 | Lemkin et al. | 446/102 |
| 4,103,451 | A * | 8/1978 | Kawada et al. | 446/99 |
| 4,259,807 | A * | 4/1981 | Siverstein | 446/320 |
| 4,897,066 | A * | 1/1990 | Tapdrup et al. | 446/97 |
| 5,067,925 | A * | 11/1991 | West | 446/397 |
| 5,148,769 | A * | 9/1992 | Zelinger | 119/708 |
| 5,387,165 | A * | 2/1995 | Warren | 482/35 |
| 5,474,032 | A * | 12/1995 | Krietzman et al. | 119/708 |
| 5,713,306 | A | 2/1998 | Johnson | |
| D395,467 | S * | 6/1998 | Bellows | D21/412 |
| 5,829,391 | A * | 11/1998 | Krietzman et al. | 119/708 |
| 5,897,417 | A * | 4/1999 | Grey | 446/125 |
| 5,897,420 | A * | 4/1999 | Lawrence et al. | 446/321 |
| 6,004,136 | A * | 12/1999 | Ehrenpreis | 434/262 |
| 6,092,489 | A * | 7/2000 | Huettner et al. | 119/707 |
| 6,216,640 | B1 * | 4/2001 | Zelinger | 119/707 |
| 6,224,450 | B1 * | 5/2001 | Norton | 446/28 |
| 6,264,522 | B1 * | 7/2001 | Dickson | 446/120 |
| 6,318,300 | B1 * | 11/2001 | Renforth et al. | 119/708 |
| 6,378,463 | B1 * | 4/2002 | Simmons | 119/707 |
| 6,629,510 | B1 * | 10/2003 | Robkin | 119/707 |
| 6,684,819 | B1 * | 2/2004 | Locke | 119/707 |
| 6,854,799 | B1 * | 2/2005 | Asbach et al. | 297/136 |
| 6,887,120 | B2 * | 5/2005 | Shamitoff | 446/99 |
| 6,892,675 | B1 * | 5/2005 | Comerford | 119/708 |
| 7,247,100 | B2 * | 7/2007 | Jackson et al. | 472/14 |
| 7,287,768 | B2 * | 10/2007 | Myers et al. | 280/87.051 |
| 7,389,748 | B2 * | 6/2008 | Shatoff et al. | 119/707 |
| 2002/0164917 | A1 * | 11/2002 | Keegan et al. | 446/71 |
| 2003/0172879 | A1 | 9/2003 | Bader | |
| 2005/0082824 | A1 | 4/2005 | Luettgen | |
| 2005/0268860 | A1 * | 12/2005 | Ritchey | 119/706 |
| 2006/0185617 | A1 * | 8/2006 | Kenny | 119/707 |

(Continued)

*Primary Examiner*—Yvonne R. Abbott
(74) *Attorney, Agent, or Firm*—Bay Area Technology Law Group PC

(57) ABSTRACT

A pet activity system for releasably joining a plurality of parts. These parts include bases, extenders and attachments wherein each is characterized as having either the male or female portion of at least one snap connector whereby the parts are releasably connectable to one another. As a preferred embodiment, multiple connectors are employed each requiring different forces to disengage those portions of the activity system that they connect from one another.

13 Claims, 3 Drawing Sheets

U.S. PATENT DOCUMENTS

2007/0119384 A1* 5/2007 Ritchey .................... 119/708
2007/0265144 A1* 11/2007 Jackson et al. ............... 482/68
2008/0196675 A1* 8/2008 Murrer ..................... 119/706
2008/0196676 A1* 8/2008 Kim et al. .................. 119/707

* cited by examiner

PET ACTIVITY SYSTEM

TECHNICAL FIELD

The present invention involves an activity system for pets, such as domestic cats which includes a base, an attachment, connectable to the base directly or through the use of an extender. It is the intent of the present invention to provide a flexible system enabling the user to interchange a myriad of parts in order to maintain the pet's interest while minimizing physical risks inherent in the use of such a system.

BACKGROUND OF THE INVENTION

Pets, particularly cats, have a natural curiosity that is constantly being challenged and satisfied. Cats enjoy swatting at moving objects such as bundled feathers, plush stuffed mice and balls; such activity oftentimes being enhanced by catnip.

In providing a system for engaging a pet's natural curiosity, certain challenges inherently present themselves. For example, many of the toys, such as feather bundles and stuffed animals are easily degraded and virtually destroyed as a cat begins to take active interest in the toy, clawing, biting and pulling upon it for extended periods of time. Thus, in order to extend the life of a pet activity system, it would be advantageous for a pet owner to be able to remove a toy at any time from the system and replace it with a new one thus extending the life of the overall system, generally.

Pet products, such as pet furniture, are generally purchased by a consumer with little or no thought being given to expanding the product's potential. For example, a pet shelter or "condo" often consists of a rectangular or rounded outer shell having an opening and perhaps a carpeted floor to provide a safe and friendly haven for the pet. However, such a product, considered a "base" in the present invention, can be made much more interesting by expanding its potential well beyond that contemplated by others. For example, several such "condos" could be snap fit together while various attachments, such as lights, bells, feathered toys and the like, could be releasably appended to such furniture to again enhance and stimulate a pet's interest.

Another challenge facing pet owners in employing virtually any activity system is the recognition that many such systems can present a safety hazard, particularly if the pet engages in such activity without human supervision. For example, many such pet toys include an umbilical causing the toy to dangle or move when swatted, the umbilical being capable of entangling a pet and potentially asphyxiating it or at least causing limb injury.

It is thus an object of the present invention to provide a system in which a plurality of parts can be releasably joined to expand the use possibilities of such a system and stimulate pet interest in engaging with it.

It is further an object of the present invention to provide a pet activity system which does not present a safety hazard to a pet whether or not the pet activity systems is employed in the presence of the pet owner.

It is yet a further object of the present invention to provide a pet activity system which can be employed in a multitude of locations and environments and which can present a suitable toy for engaging a pet and which can be replaced once worn or degraded without having to replace the entire system.

These and further objects will be more readily apparent when considering the following disclosure and appended claims.

SUMMARY OF THE INVENTION

The present invention is directed to a pet activity system for releasably joining a plurality of parts, the plurality of parts comprising a member selected from the group consisting of bases, extenders and attachments and combinations thereof wherein each of said parts are characterized as having either the male or female portion of at least one snap connector whereby said parts are releasably connectable to one another.

DETAILED DESCRIPTION OF THE INVENTION

Figure 1A:
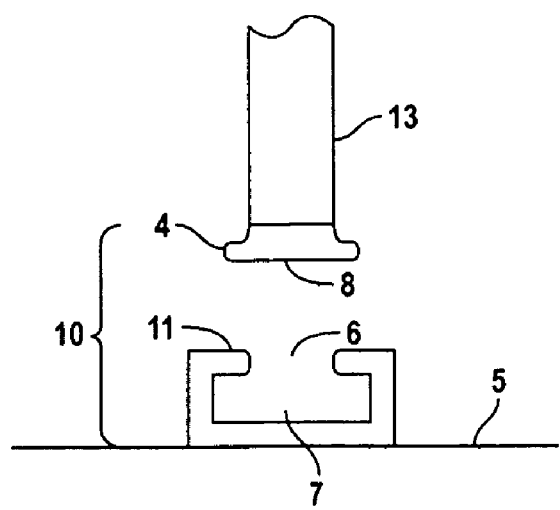
FIG. 1A is a side view or partial cross-section showing a typical connector for use in practicing the present invention.
Figure 1B:
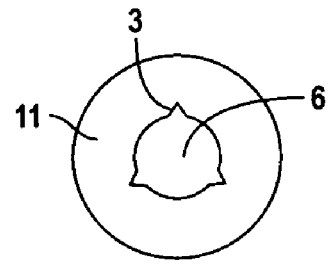
FIG. 1B is a top plan view of a portion of the connector of FIG. 1A.

As previously noted, the invention involves a pet activity system for releasably joining a plurality of parts. These parts include a member selected from the group consisting of bases, extenders and attachments and combination thereof wherein each of the parts is characterized as having either the male or female portion of at least one snap connector in which the parts are releasably connectable to one another. The snap connector is shown in FIGS. 1A and 1B as element 10. In this regard, the lower end of extender 13 is shown residing above a portion of base 5 ready to releasably connect thereto. Base 5 is provided with female portion 11 having opening 6 configured on its top surface and hollowed out region 7 for receipt of male portion 8 of snap fit connector 10. Expanded region 4 pushes within opening 6 facilitated by cut out tabs 3 located 120° apart on circular cut out region 6 and into female receiving region 7 and remains in place until it is physically removed. Obviously, female portion 11 can reside within base 5 presenting nothing more than opening 6 to the casual observer.

Base 5 can consist of any one of a number of commonly employed household articles and pet related furnishings while remaining within the spirit and scope of the present invention. Base 5 can include such diverse items as pet furniture, pet beds, weighted supports, suction cups, doors, doorknobs, desks, tables, floors, walls, loops, gloves, mitts, door jam clips, toys, wands, pet carriers, feed devices, kennels, litter pans, electronic movement devices and rings.

Extender 13 can be eliminated enabling a suitable pet toy or other attractant configured with the appropriate snap connector to be applied directly to a suitable base 5. When extender 13 is employed, it can include any one of a number of rigid or flexible elements for connecting an attachment to a base, the group including plastic wands, metal wands, springs, ropes, wires, cords, fur strips, leather strips, leashes, belts, elasticized and non-elastic fabric, bungees and string.

The attractants, themselves, can also include a wide variety of items intended to engage and attract an animal. Obviously, oftentimes attractants will vary depending upon the variety of domestic pet intended to make use of this invention. Such attachments include pet toys, feathered bundles, stuffed animals, catnip pouches, balls, bells, lights, electronic sound generators, crackle fabrics, scratching and resting surfaces and food treats.

Figure 5:
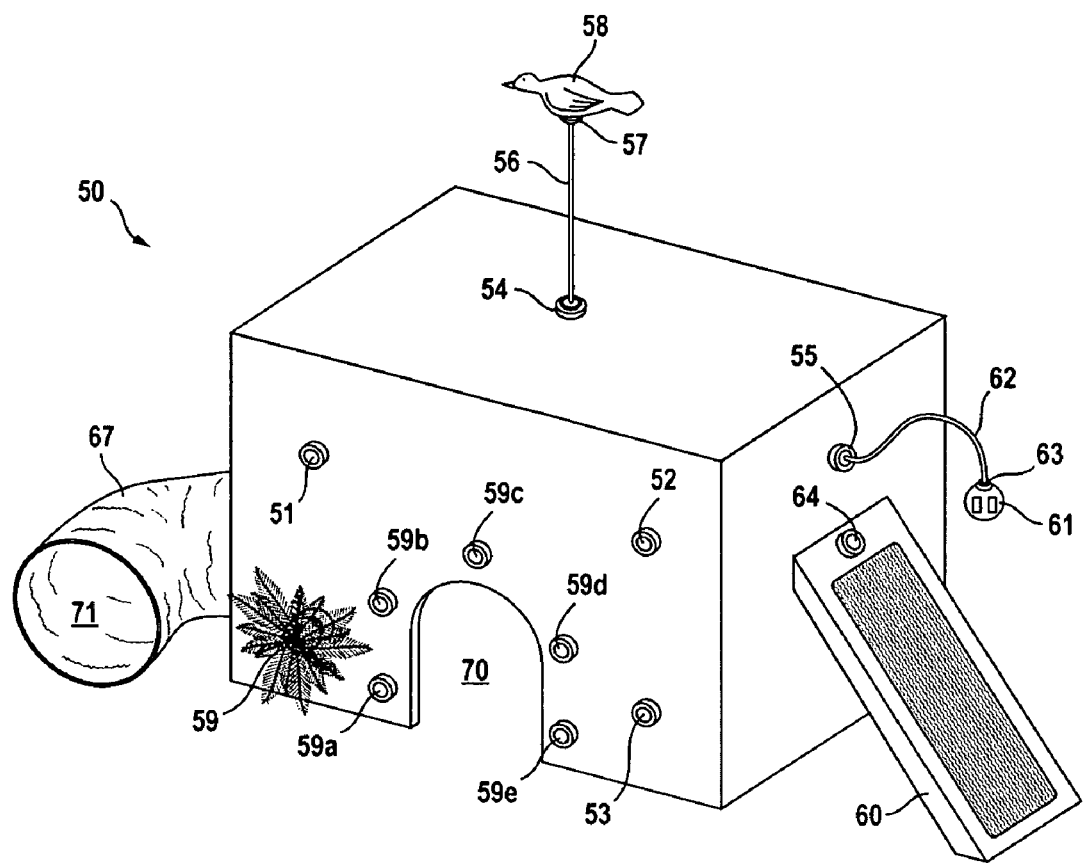
FIG. 5 is a perspective view of pet furniture acting as a the base for supporting the activity system of the present invention.

Reference is now made to FIG. 5 as a means of gaining further insight into the breadth and scope of this invention. Structure 50 is shown in the form of a pet house or shelter commonly employed to provide a domestic cat with a secluded space as a retreat. As applied to the present invention, shelter 50 is considered the base of this invention and includes a number of snap fit connectors 51 through 55 and 59a-59e, many of which remain unoccupied but available for future use.

On the top surface of shelter 50 is shown snap fit connector 54 engaging extender 56 in the form of a coiled helical wire contained within a sheath of loosely fitting fabric. Second snap fit connector 57 is located at a second end of extender 56 which interfaces with a complimentary male/female portion of a connector permanently affixed to attachment 58, in this instance, in the form of a stuffed bird.

Several aspects of the present invention become readily apparent in considering that portion of FIG. 5 discussed to this point. More specifically, it should be quite obvious that stuffed bird 58 could remain snap fit to extender 56 and this combination moved to any of the other snap fit receiving ports 51, 52, or 53. Also, stuffed bird 58 could be removed from extender 56 and replaced with another attachment either because stuffed bird 58 becomes worn through use or if a pet tires of this attachment and a pet owner, recognizing this, wishes to stimulate his or her pet by placing a different attachment to extender 56. Finally, extender 56 could be eliminated and stuffed bird 58 could be attached to snap fit connector 54 or any of the other snap fit connector ports as shown. This direct attachment embodiment eliminating extender 56 is shown on the front of pet furniture 50, in this instance, feathered ball 59 is shown appended directly to the front face of pet furniture 50 employing a suitable snap fit connector.

As noted, multiple attachments can be employed on a single base while remaining within the spirit and scope of this invention. Turning again to FIG. 5, incline scratcher 60 is shown to be releasably attached to pet furniture 50 through the use of suitable snap fit connectors (not shown). Above scratcher 60 spherical bell 61 is releasably connected to extender 62 through the use of snap fit connector 63 noting that extender 62 is shown to be releasably connected to furniture 50 through snap fit connector 55. As such, a cat wishing to use incline scratcher 60 could also swat at bell 61 as a further attractant. However, bell 61 could be removed from pet furniture by simply detaching snap fit connector 55. Similarly, incline scratcher 60 could be removed once worn or when a cat tires of it while allowing spherical bell 61 to remain in place. Alternatively, extender 62 could be released from snap fit connector 55 and inserted within snap fit connector 64 located within a top edge surface of incline scratcher 60. In doing so, incline scratcher 60, itself, becomes a "base" for extender 62 and spherical bell 61. As such, the present invention can be used by appending two "bases" together; in this instance, pet furniture 50 could be considered the first base while incline scratcher a second base. Similarly, pet tunnel 67 could be appended to a side opening within pet furniture 50 using snap fit connectors to enable a pet to enter and exit the interior of this structure through opening 70 or through a side opening (not shown) and through opening 71. Pet tunnel 67 could also be moved to extend from opening 70 using snap fit connectors 59a-59e, which can also be placed on an interior surface of pet furniture 50 proximate opening 70.

As previously noted, the present invention also deals with the concern that many pet owners have that attachments such as toys and other amusement devices designed for pets may, in fact, create a hazard, particularly when a pet uses them without human supervision. In this regard, reference is first made to FIG. 2 showing another embodiment of the present invention.

Figure 2:
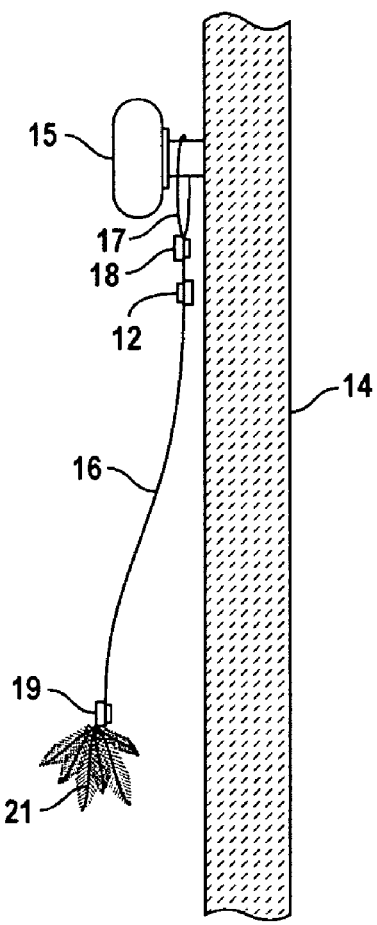
FIG. 2 is a side elevational view of a typical activity system, in this instance being releasably connected to a doorknob.

Regarding FIG. 2, pets, and particularly cats, oftentimes enjoy swatting at free hanging objects such as feathers 21 tethered to doorknob 15 through the use of extender 16. Doorknob 15 acts to support loop 17 the later functioning as the "base" for this pet toy wherein extender 16, in the form of, for example, a strip of fabric, fur, elasticized cord such as a bungee, spring, string or rope wraps around doorknob 15 by virtue of loop 17 and is fixed upon itself at first snap fit connector 18. Extender 16 is connected to "base" 17 by second snap fit connector 12 and hangs outside of door 14 tethered to feather toy 21 by snap fit connector 19. In use, a cat will oftentimes swat at feathered toy 21 causing extender 16 to move side to side and/or up and down further attracting a cat to engage in additional play activity. Unfortunately, however, toys such as that shown in FIG. 2 can represent a hazard particularly if a cat becomes entangled in extender 16. As the cat gets further entangled, extender 16 can oftentimes wrap itself around the cat's neck causing asphyxiation. This can be substantially prevented by practicing the present invention.

Specifically, it is proposed as a preferred embodiment that snap fit connector 12 requires relatively little force to disengage when compared to the force required to disengage snap fit connector 19. Second snap fit connector 19 is provided to enable a pet owner to replace toy 21 when needed without replacing the other components of the system. As the pet cat swats at extender 16, which can include clawing and pulling while biting upon feather toy 21, prior to hazardous entanglement with extender 16, snap fit connector 12 would release from loop 17. Thus extender 16 would represent nothing more than a leash providing little or no hazard to the pet. Further, once snap fit connector 12 disengages, toy 21 and its appended extender 16 would be caused to lay somewhat dormant on a floor or other surface resulting in the pet loosing interest in it prior to a potentially dangerous entanglement.

Differential (selective) release of one snap fit connect over another can be facilitated in several ways. A first is to vary the relative size of expanded region 4 on male portion 8 vis-à-vis the size of opening 6. A second is to vary materials. For example, snap fit connectors of nylon would be stiffer than those of polypropylene.

Figure 3:
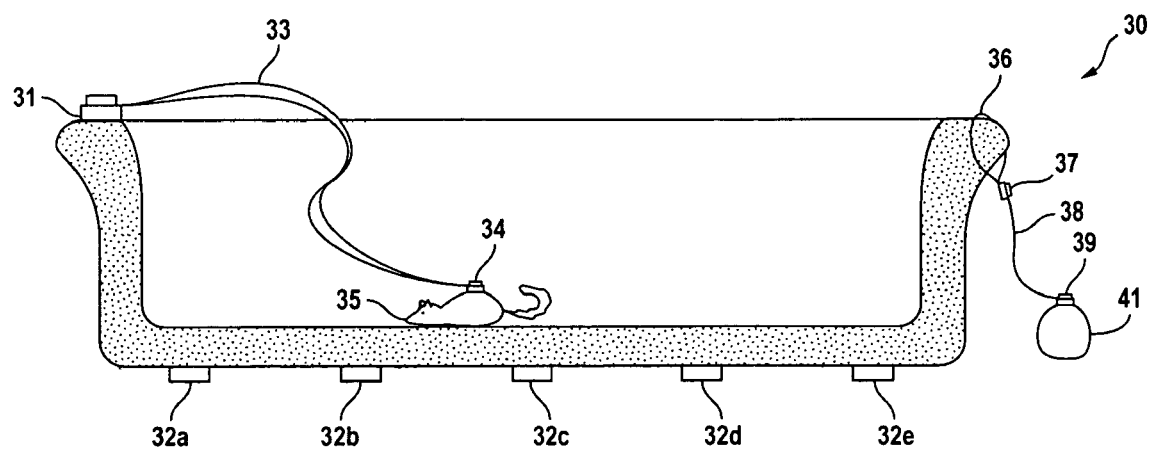
FIG. 3 is a side plan view of a pet bed showing several embodiments of the pet activity system constituting the present invention.

As a further illustration, reference is made to FIG. 3 depicting pet bed 30. Pets oftentimes enjoy lounging in a bed while swatting and engaging various pet toys in doing so. Pet bed 30 depicts the use of two attachments in the form of toys noting that any embodiment of the present invention can employ a number of such attachments while remaining within the spirit and scope of this invention. Bed 30 can also be attached to furniture and window perches using the present invention, by virtue of snap fit connectors 32a-32e. In this regard, pet bed 30 is used as a base for supporting pet toy 35 in the form of a plush mouse and ball 41. Pet toy 35 is tethered via extender 33 to snap fit connector 31. The pet mouse 35 is, itself, releasably attached to extender 33 by second snap fit connector 34.

On the outside of pet bed 30 is hung ball 41 dangling from pet bed 30 via extender 38. Extender 38 is looped about a side wall of pet bed 30 by virtue of loop 36 which functions as the "base" using first snap fit connector 37 while second snap fit connector 39 is employed to connect ball 41 to extender 38. As was the case with the embodiment of FIG. 2, connectors 31 and 34 on the one hand and 37 and 39 on the other can be selected such that different forces are required to disengage those portions of the activity system from one another. This is viewed as being particularly important in the embodiment of FIG. 3 where a pet, such as a cat is likely to roll about within pet bed 30 and thus be more vulnerable to asphyxiation if extender 33 was to wrap around its neck. The possibility of this occurring is also enhanced if toy 35 contains a catnip pouch or feathers embedded therein. Ball 41 can also contain catnip or, for example, a bell or other sound or light producing mechanism to attract and engage a pet.

Figure 4:
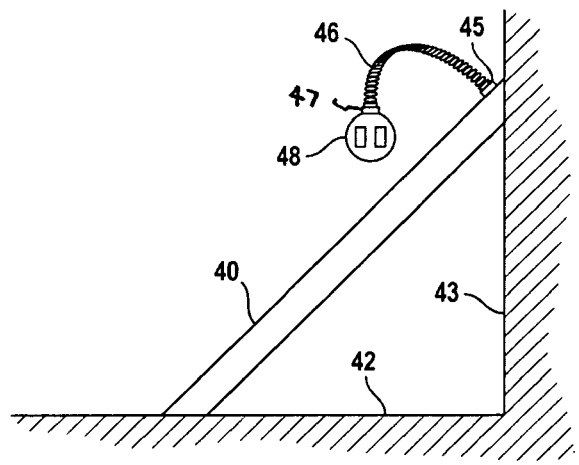
FIG. 4 is a side elevational view of a further embodiment of the present invention, for use with a cat scratcher.

FIG. 4 highlights the notion that the inclined scratcher 60 of FIG. 5 used as an attachment can also act as a base for other attachments and extenders. In this embodiment, cat scratcher 40 is shown diagonally supported between vertical wall 43 and horizontal floor 42. Scratcher 40 can include a top surface such as cardboard, carpet or sisal which may further contain catnip to provide a pet cat with a suitable scratching surface. Such items are well known in the pet industry and are widely distributed.

A first snap fit connector 45 appends extender 46 to scratcher 40 in order to dangle ball 48 therefrom by virtue of second snap fit connector 47. In this embodiment, extender 46 can comprise, for example, a coiled spring to maintain ball 48 above the surface of scratcher 40. Thus, as a cat engages scratcher 40, it can further swat ball 48 causing a sound, light or attractant, such as catnip odor, to emanate therefrom. As with the previous embodiments, as a preferred embodiment, it is contemplated that first snap fit connector 45 and second snap fit connector 47 require different forces to disengage those portions of the activity system that they connect from one another to enhance pet safety.

Figure 6:
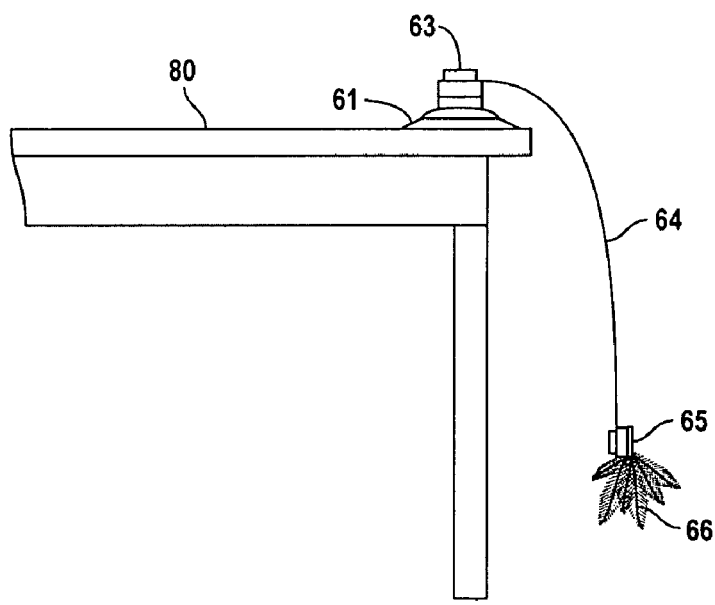
FIG. 6 is a side plan view of the pet activity system, in this instance being appended to an article of furniture.

Finally, reference is made to FIG. 6 showing the use of the present pet activity system in conjunction with ordinary household furniture. In this instance, desk 80 supports feather toy 66. Specifically, suction cup or weighted base 61 is releasably caused to engage the top surface of desk 80. Extender 64, in this instance is a length of fabric appended to snap fit connector 63. Feather toy 66 is, in turn, appended to extender 64 by virtue of second snap fit connector 65. As was the case with FIG. 2, it is contemplated that if a pet, such as a cat was to swat at feather toy 66 while getting further animated and entangled by engaging the toy, snap fit connector 63 could, as a preferred embodiment, disengage thus reducing the risk of injury prior to the release of second snap fit connector 65.

The embodiments shown in FIGS. 1-6 are not intended as being limiting but simply provide examples of various environments in which the present invention can be employed. It should be quite obvious to anyone exposed to this disclosure that there are many other current pet items and household furniture and objects which can benefit from the activity system of this invention.

The invention claimed is:

1. A pet activity system comprising a plurality of parts, a first one of said parts comprising per furniture having a surface, a second one of said parts comprising at least one extender, and a third one of said parts comprising at least one pet attractant, said pet furniture having a plurality of male or female snap connectors on its surface, each extender having a first end and a second end having male or female snap connectors on each of said first and second ends and said pet attractant having a male or female snap connector wherein each said extender can releasably connect to each of said plurality of male or female snap connectors on said surface and each said pet attractant can releasably connect to each extender and to each of said plurality of male or female snap connectors on said surface.

2. The pet activity system of claim 1 comprising a plurality of extenders and a plurality of pet attractants, each having male or female snap connectors and each of which being releasably connectable to all of said plurality of male or female snap connectors on said surface.

3. A pet activity system comprising a plurality of parts, at least one of said parts comprising pet furniture and at least one of said parts comprising a pet attractant, each of said plurality of parts further comprising either the male or female portion of a snap connector for releasably connecting said pet attractant to said pet furniture and further comprising an extender having a length and terminal ends, each of said terminal ends having a snap connector for releasably connecting said terminal ends to said pet furniture and to said attractant.

4. The pet activity system of claim 3 wherein said extender comprise a member selected from the group consisting of plastic wands, metal wands, springs, ropes, wires, cords, fur strips, leather strips, leashes, belts, elasticized and non-elastic fabrics, bungees and string.

5. The pet activity system of claim 3 wherein said attractant comprises a member selected from the group consisting of pet toys, feathered bundles, stuffed animals, catnip pouches, balls, food treats, bells, electronic sound generators, scratching and resting surfaces and lights.

6. The pet activity system of claim 3 wherein snap connectors releasably connect said extender to said base and said attractant to said extender, whereby differing force is required to disengage said extenders from said base and said attachment from said extender.

7. The pet activity system of claim 3 comprising a plurality of extenders and attractants, said plurality of extenders being releasably connected to said base and each of said plurality of extenders being releasably connected to an attractant.

8. The pet activity system of claim 3 wherein said pet furniture comprises a pet shelter having an interior space and openings to provide access to said interior space to a pet.

9. The pet activity system of claim 8 wherein at least one of said snap connectors is located on an exterior surface of said pet furniture.

10. The pet activity system of claim 3 wherein said pet furniture comprises a pet bed.

11. The pet activity system of claim 3 wherein said system comprises a plurality of pet furniture.

12. The pet activity system of claim 3 wherein said attractant comprises cat scratchers.

13. The pet activity system of claim 3 wherein said attractant comprises crackle fabrics.

* * * * *